Figure 1:
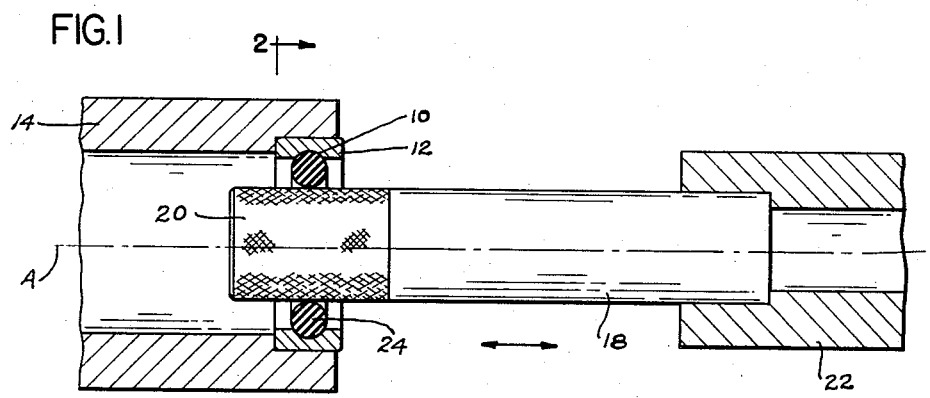

July 26, 1960  C. N. HAY  2,946,160
METHOD AND APPARATUS FOR FINISHING ANNULAR GROOVES
Filed Jan. 29, 1959

INVENTOR.
CHARLES N. HAY
BY Edward H. Goodrich

HIS ATTORNEY

United States Patent Office 2,946,160
Patented July 26, 1960

2,946,160

METHOD AND APPARATUS FOR FINISHING ANNULAR GROOVES

Charles N. Hay, Sandusky, Ohio, assignor to General Motors Corporation, Detroit, Mich., a corporation of Delaware Filed Jan. 29, 1959, Ser. No. 790,007

10 Claims. (Cl. 51—58)

This invention relates to the method and apparatus for finishing annular grooves and more particularly to a method and machine for lapping a surface of revolution which is curved in more than one plane such as the annular raceway of a ball bearing.

Many precision devices employing rotatable shafts require ball bearings of extreme accuracy and having low starting torque. Also, there is an ever-increasing demand for quiet, smooth-running ball bearings for the precision antifrictional support of shafts or spindles which are often operated continuously at speeds as high as 100,000 r.p.m. The precision grinding operations commonly used in forming such raceways, although highly accurate, often fail to provide the required smoothness of raceways for such bearings. Consequently, it has been prior practice to attempt to finally smooth the surfaces of such raceways and to remove their minute roughness by hand lapping operations. However, hand lapping is necessarily slow, lacking in uniformity and depends particularly upon the abilities of the operator with the result that no two raceways are lapped to the same accuracy and smoothness. The non-uniformity produced by such hand lapping operations is most evident in internal raceways since the lapping tool which is held against the raceway by the operator is usually small and of short arcuate extent. As a result, many bearings having hand-lapped raceways are unacceptable since they do not produce a sufficiently smooth running bearing or the requisite accuracy to satisfy the demands of many precision instruments.

It is, therefore, an object of this invention to provide an improved lapping method and apparatus which will rapidly and accurately produce controlled precision lapping operations with consistency on annular surfaces.

Another object is to provide an improved lapping mechanism for an annular surface which is curved in more than one plane.

A further object of the invention is to provide an improved rapidly operating and simple lapping mechanism for a ball bearing raceway wherein a generally C-shaped lapping member yieldably and matingly engages the raceway and is subjected to changing movements within the raceway about more than one plane.

To these ends and also to improve generally upon methods and devices of the character indicated, my invention consists in the various matters hereinafter described and claimed. In its broader aspects, the invention is not necessarily limited to the specific construction selected for illustrative purposes in the accompanying drawings wherein Figure 1 is a fragmentary side elevation showing the invention and having parts cut away to better illustrate my lapping method.

Figure 2:
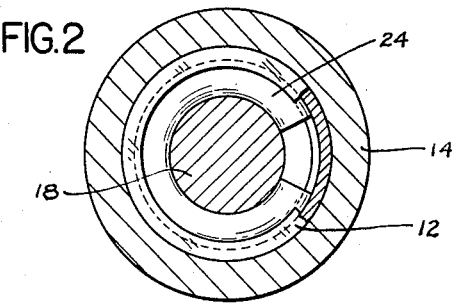
Figure 3:
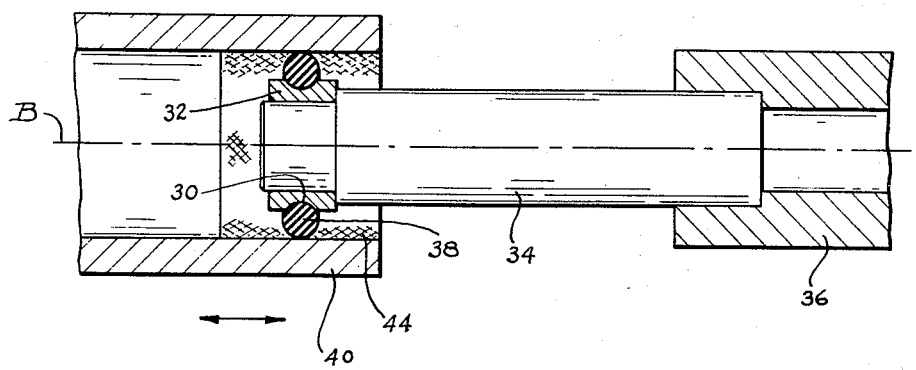

Figure 2 is a fragmentary diametrical section taken substantially along the line 2—2 of Figure 1; and Figure 3 is a fragmentary elevation of a modified form of the invention.

Generally considered, my lapping method and apparatus is particularly adapted to provide a finishing or lapping operation upon the annular raceway of a ball bearing as a raceway 10 in a race ring 12. A suitable chuck 14 demountably holds the race ring 12 and is arranged to be rotatably driven about an axis A common to both the race ring and the chuck. If desired, this chuck may be supplied with a circumferential oscillation about the axis A rather than with a continued rotation. A cylindrical rod 18, having a knurled or roughened end portion 20 extending through the race ring 12, is demountably gripped at its other end by a holder or chuck 22 and located coaxial of the axis A. This holder 22 is suitably mounted as upon a pair of ways (not shown) and may be endwise reciprocated through a controlled distance to impart an endwise movement to the rod 18 coaxial of its axis A. If desired, the chuck 14 may be both rotated and endwise reciprocated.

A yieldably resilient cord 24 is fitted within the raceway 10 and circumferentially extends a major portion of the distance around and in engagement with the knurled portion 20 as best shown in Figure 2. This cord is preferably of a diameter to yieldably and resiliently seat against the entire transverse curvature of the raceway 10. Also, the knurled portion 20 is of a diameter to grip against and fit within the cord while slightly deforming it into resilient raceway engagement. The transverse radius of the cord is preferably slightly less than the radius of transverse curvature of the raceway 10 so that the yieldable deformation imparted to the cord will cause it to arcuately conform to the raceway without laterally overlapping the outer transverse edges of the raceway. Various materials may be used for the yieldable cord 24 such as a cord of woven fibers which may be individually impregnated with an elastomeric material of the character of "neoprene" or the like. Also, it has been found satisfactory to use a molded resilient "neoprene" either solid or tubular member having a slightly roughened outer circular surface. Before the start of a lapping operation, the cord 24 may be charged with an abrasive compound having finely comminuted abrasive grains as rouge, alumina, silicon carbide, chromium oxide, diamond dust or other suitable abrasive. If desired, this abrasive may be in the presence of a suitable lubricant as a light oil or may even be applied as a slurry. In the event that the cord 24 is made of woven resilient coated fibers, the lapping compound will fill the interstices between the fibers and suitably exude therefrom during the lapping operation. If the cord 24 is in the form of a molded resilient elastomeric member such as "neoprene," the lapping compound may be flowed or suitably fed in the form of a slurry between the external surface of the cord and the raceway during a lapping operation.

During lapping, the circumferential rotation or arcuate oscillation of the chuck 14 about the axis A, coupled with the axial reciprocation of the knurled portion 20 which grips the cord, provides a combined relative rotation between the resilient cord 24 and the raceway 10 while the knurled portion 20 produces a rolling action of the cord 24 transversely of the raceway and in interfitting relation therewith. Due to the fact that the cord 24 extends a major portion of the distance around the raceway but still has spaced apart ends, the cord will be free to assume the desired rolling action during lapping. Also, this rolling movement of the cord coupled with the rotational movement of the raceway 10 serves to uniformly distribute the lapping compound as well as to simultaneously lap substantially the entire circumference of the raceway thus producing a highly uniform lapping operation and greatly improving the raceway surface both as to uniformity smoothness and accuracy. This particular lapping arrangement consistently produces the same accurate lapping operation on successive work pieces. The fit of the knurled portion 20 within the cord 24 is preferably just sufficient to lightly deform the cord into a uniform mating fit against the raceway while assuming a positive frictional drive between the rod 18 and the cord.

In the embodiment shown in Figure 3, there is provided the same general arrangement for lapping a raceway 30 on an inner race ring 32 demountably pressed in driven relation over the reduced end of an arbor 34 secured within a chuck 36 which is arranged to rotate the arbor about its axis B. An inherently resilient lapping cord 38 is charged with a lapping compound and is wrapped about the raceway 30 in generally the same manner as explained with reference to the cord 24. A tube 40 coaxial of the axis B has an inner cylindrical bore 42 that is preferably roughened or knurled at 44 and which compressively engages the periphery of the cord 38. As in the case of the cord 24, the cord 38 preferably has a transverse radius slightly less than that of the transverse curvature of the raceway 30 so that the cord 38 will closely interfit against the raceway 30 without laterally overlapping the outer edges of this raceway during a lapping operation. During lapping, the tube 40 may be axially reciprocated longitudinally of the axis B and the shaft 34 may be rotated by the support 36 to produce the combined relative rotation of the cord about two axes so that the cord will both roll transversely of and slide circumferentially of the raceway 30. In both of the above described embodiments, the closely spaced free ends of the cord facilitate the transverse rolling action of the cord in the raceway.

I claim:

1. The method of lapping an annular surface having a transverse curvature comprising the steps of locating an elongated yieldable lapping member against an arcuate portion of said surface, providing a lapping medium between the lapping member and said surface, producing a relative rotation between the lapping member and said surface in a direction circumferentially of said surface, and providing a rotating movement of the lapping member transversely of said surface while in engagement therewith.

2. The method of lapping an annular surface of revolution having a uniform transverse curvature comprising the steps of fitting a yieldable lapping member into circumferentially conforming relation with said surface, providing a lapping compound between the lapping member and said surface, producing a relative rotation between the lapping member and said surface circumferentially of the surface, and simultaneously providing a rotating movement of the lapping member transversely of said surface.

3. The method of lapping an annular surface of revolution having a transversely arcuate contour comprising the steps of seating an elongated yieldable lapping member of circular cross section in conforming relation with an arcuate portion of said surface throughout the major extent of the circumference of said surface, providing a lapping compound between the lapping member and said surface, producing a relative circumferential rotation between said surface and the lapping member and producing an arcuate movement of the lapping member across the surface and about the center of transverse curvature of said surface.

4. In a device for lapping a surface of revolution on a ring, said surface having a transversely arcuate curvature, a chuck arranged to be rotated about its longitudinal axis, means on said chuck demountably gripping the ring coaxial of said axis for rotation of the ring, an elongated yieldable lapping member of circular cross section arcuately seated against said surface of revolution, a supporting member arranged to be reciprocated longitudinally of said axis, said supporting member having a cylindrical portion frictionally engaging the lapping member and holding it in yieldably seated conforming relation with said surface.

5. In a device for lapping an annular transversely arcuate raceway formed within a ring, a chuck arranged to be rotatably driven about an axis extending longitudinally therethrough, means on the chuck demountably holding the ring coaxial of the chuck axis for rotation with said chuck, an elongated yieldable lapping member arcuately seated against the raceway, said lapping member having a round cross section, a supporting member having a cylindrical portion frictionally engaging the lapping member and holding the lapping member in yieldably seated position, means providing for an axial reciprocation of the supporting member to roll the lapping member transversely within the raceway during a relative circumferential rotation between the race ring and the lapping member.

6. In a device for lapping an annular raceway in a ball bearing race ring, said raceway having a uniform transversely arcuate curvature, a chuck arranged to be rotatably driven about its axis, means on the chuck demountably holding the race ring coaxial of the chuck axis, a supporting member having an axis coaxial of the chuck axis and arranged for endwise reciprocation longitudinally of said axis, the supporting member having a cylindrical portion in radially spaced relation from and coaxial with said raceway, and an elongated yieldable lapping member of circular cross section compressibly received between said cylindrical surface and the raceway for arcuate seating relation in the raceway and said lapping member extending the major portion of the distance around the raceway and having arcuately spaced ends.

7. In a device for lapping an annular transversely arcuate raceway in a race ring, a chuck arranged to be rotatably driven about a longitudinal axis extending therethrough, means on the chuck demountably gripping the ring for rotation of the ring coaxial with said chuck, an elongated yieldable lapping member arcuately seated against the raceway and having a round cross section, a supporting member having a cylindrical portion coaxial of said chuck axis and extending through the race ring and into said chuck, said cylindrical portion frictionally engaging the lapping member and compressing it into yieldably seated mating relation against the raceway, and means providing for an axial reciprocation of the support member to roll the lapping member transversely within the raceway during a relative circumferential rotation between the raceway and said lapping member.

8. In a device for lapping an annular raceway in a ball bearing race ring, said raceway having a uniform transverse arcuate curvature, a chuck arranged to be rotatably driven about a longitudinal axis extending therethrough, means on the chuck demountably and peripherally gripping the race ring for rotation of the race ring coaxial of the chuck axis, a support member having a cylindrical portion coaxial of the chuck axis and extending through said race ring in uniformly radially spaced relation to said raceway, said support member being arranged for endwise reciprocation longitudinally of said axis, an elongated resilient lapping member of circular cross section compressibly and arcuately received between said cylindrical surface and the raceway for matingly seated relation against the raceway, said lapping member extending the major portion of the distance around the raceway and having arcuately spaced ends, and the axial reciprocation of the support member being arranged to provide a transverse rolling action of the lapping member within the raceway during a relative rotation between the raceway and said lapping member.

9. In a device for lapping an annular transversely arcuate raceway formed within the periphery of a race ring, an arbor arranged to be rotatably driven about a longitudinal axis extending therethrough, means on the arbor demountably receiving the race ring for coaxial rotation with said arbor, an annular support member having a cylindrical inner wall coaxial with said arbor axis and radially spaced from the race ring mounted on said arbor, means providing endwise reciprocation of the support member, and a yieldable lapping member of circular cross section compressibly received between the cylindrical wall and said raceway and wrapped about the raceway through the major portion of the circumferential extent of said raceway, the endwise reciprocation of the support member providing a rolling action of the lapping member transversely of the raceway and the rotation of said arbor providing a relative circumferential lapping action between the lapping member and the raceway.

10. In a device for lapping an annular raceway in a ball bearing race ring, said raceway having a uniform transversely arcuate curvature, a chuck arranged to be rotatably driven about an axis longitudinally extending therethrough, means on the chuck demountably holding the race ring coaxial of the chuck axis, a supporting member having an axis common with the chuck axis and arranged for endwise reciprocation, the supporting member having a roughened cylindrical surface radially spaced from the raceway, and an elongated yieldably resilient lapping member of circular cross section compressibly received between said cylindrical surface and the raceway for matingly seated engagement with the raceway throughout the major extent of the raceway circumference, and said lapping member having a cross section radius which is less than that of the transverse raceway radius before the lapping member is compressed into raceway engagement.

References Cited in the file of this patent

UNITED STATES PATENTS 2,398,022     Marren _____ Apr. 9, 1946